US012443907B2

(12) United States Patent
Deshpande et al.

(10) Patent No.: US 12,443,907 B2
(45) Date of Patent: Oct. 14, 2025

(54) METHOD AND SYSTEM FOR SUSTAINABLE DEVELOPMENT GOAL (SDG) PERFORMANCE ASSESSMENT OF AN ENTERPRISE

(71) Applicant: Tata Consultancy Services Limited, Mumbai (IN)

(72) Inventors: Shailesh Shankar Deshpande, Pune (IN); Shivani Nigam, Mumbai (IN); Mahesh Kshirsagar, Mumbai (IN); Balamuralidhar Purushothaman, Bangalore (IN); Sonam Sharma, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 247 days.

(21) Appl. No.: 18/191,604

(22) Filed: Mar. 28, 2023

(65) Prior Publication Data

US 2023/0334407 A1    Oct. 19, 2023

(30) Foreign Application Priority Data

Apr. 18, 2022   (IN) .............................. 202221022783

(51) Int. Cl.
*G06Q 10/06*     (2023.01)
*G06Q 10/0639*   (2023.01)

(52) U.S. Cl.
CPC .............................. *G06Q 10/06393* (2013.01)

(58) Field of Classification Search
CPC ................................................ G06Q 10/06393
See application file for complete search history.

(56) References Cited

U.S. PATENT DOCUMENTS

2021/0134146 A1\*  5/2021  Meshram ............... G06V 20/52
2022/0391797 A1\* 12/2022  Stein ....................... G06Q 10/08
(Continued)

FOREIGN PATENT DOCUMENTS

CA          2886453 A1 \*  4/2014  ............... A01G 9/14

OTHER PUBLICATIONS

Cohen, Brett, et al. "Co-benefits and trade-offs of climate change mitigation actions and the Sustainable Development Goals." Sustainable Production and Consumption 26 (2021): 805-813. (Year: 2021).\*

(Continued)

*Primary Examiner* — Hamzeh Obaid
(74) *Attorney, Agent, or Firm* — FINNEGAN, HENDERSON, FARABOW, GARRETT & DUNNER LLP (57) ABSTRACT

Assessing sustainability performance of an enterprise is a challenging task. Embodiments of present disclosure provide a method and system for SDG performance assessment of an enterprise with a conceptually simpler data model and processing pipeline. Enterprise data collected from hard and soft sensors is mapped to appropriate indicators of the SDGs. Further, a semantic network is constructed with nodes corresponding to each indicator and edges connecting nodes belonging to same SDG. Each node of the semantic network is further linked to a first layer of a neuro fuzzy network which calculates degree of impact of the indicator on Social, Economic and Environment values. Output of the first layer activates second layer of the neuro fuzzy network which determines BBV scores indicating whether the indicator is a burden, benefit, or vulnerability. The BBV scores are transformed to a colour space to generate a colour that indicates SDG performance of the enterprise.

18 Claims, 5 Drawing Sheets

(56) References Cited

U.S. PATENT DOCUMENTS

| | | | | |
|---|---|---|---|---|
| 2023/0004902 A1* | 1/2023 | Shinozuka | ....... | G06Q 10/06313 |
| 2023/0266061 A1* | 8/2023 | Sargsyan | ............ | B01D 53/002 62/618 |

OTHER PUBLICATIONS

Lee, Keeheon, and Hosang Jung. "Dynamic semantic network analysis for identifying the concept and scope of social sustainability." Journal of Cleaner Production 233 (2019): 1510-1524. (Year: 2019).*

Grainger-Brown, Jarrod, and Shirin Malekpour. "Implementing the sustainable development goals: A review of strategic tools and frameworks available to organisations." Sustainability 11.5 (2019): 1381. (Year: 2019).*

Halkijevic, Ivan, Zivko Vukovic, and Drazen Vouk. "Indicators and a neuro-fuzzy based model for the evaluation of water supply sustainability." Water resources management 31 (2017): 3683-3698. (Year: 2017).*

Surana, Kavita, Anuraag Singh, and Ambuj D. Sagar. "Strengthening science, technology, and innovation-based incubators to help achieve Sustainable Development Goals: Lessons from India." Technological Forecasting and Social Change 157 (2020): 120057. (Year: 2020).*

Türkeli, Serdar, "Complexity and the Sustainable Development Goals: A Computational Intelligence Approach to Support Policy Mix Designs", Title of the item: Article, Date: Jan. 2020, vol. 2 (1), Publisher: Hapres, Link: https://www.hapres.com/UpLoad/PdfFile/JSR_1163.pdf.

Ruben R. Ben, et al, "Performance evaluation of lean sustainable systems using adaptive neuro fuzzy inference system: a case study", Title of the item: International Journal of Sustainable Engineering, Date: Feb. 2017, vol. 10 (3), pp. 158-175, Publisher: Taylor & Francis, Link: https://www.tandfonline.com/doi/epdf/10_1080/19397038.2017.1286409?needAccess=true&role=button.

Nilashi, Mehrbakhsh et al., Title: Measuring Country Sustainability Performance Using Ensembles of Neuro-Fuzzy Technique, Title of the item: Sustainability, Date: 2018, vol. 10 (8), Publisher: MDPI, Link: https://www.mdpi.com/2071-1050/10/8/2707.

* cited by examiner

METHOD AND SYSTEM FOR SUSTAINABLE DEVELOPMENT GOAL (SDG) PERFORMANCE ASSESSMENT OF AN ENTERPRISE

PRIORITY CLAIM

This U.S. patent application claims priority under 35 U.S.C. § 119 to: Indian Patent Application No. 202221022783, filed on Apr. 18, 2022. The entire contents of the aforementioned application are incorporated herein by reference.

TECHNICAL FIELD

The disclosure herein generally relates to the field of performance assessment, and, more particularly, to method and system for sustainable development goal (SDG) performance assessment of an enterprise.

BACKGROUND

Sustainability is defined as "an ability to meet the present needs without compromising future . . . ". In the spirit of the definition, the goal is for entire humanity and each individual part of it. While sustainable energy determines the sustainability of a system to large extent, sustainable system is not possible without the sustainable parts and practices. Enterprises are one of the parts of the system. They provide important socioecological function of wealth generation for self and society. While policy makers play an important role of regulating social resources, enterprises burden the social resources because of their activities. The economic sustainability is viable only if enterprises remain relevant socio-ecologically. The sustainability definition can be tweaked a little for an enterprise or organization, without changing the spirit of it, as "a likelihood of successfully continuation of the socio-ecological functions, for a sufficiently long time". This depends upon many factors. Availability of energy and other resources at sustainable rate, sustainable operations, and sustainable socio-ecological function are three underlying parameters of the sustainability of an enterprise. Following list elaborates conditions under which an enterprise may remain sustainable. These factors follow input-process-output model, that is, each factor is derived from input space, process space, and output space of an enterprise. For example, an enterprise consumes some resources (energy, time, materials) and produces products (soft or hard) by some process (men and machines). Sign indicates the factors leading to the positive or negative effect on Social, Economic. Environmental/ecological (SEE) benefits. (i)–Rate of consumption of raw materials is less than rate of production of raw materials (the mass balance directly relates to the sustainability, it is environmental performance indicator as well), (ii)+Physical infrastructure, men and materials are not threatened or are resilient under any external calamity resulting from natural or anthropogenic causes. This is the ability to function under internally and externally adverse conditions, (iii)+Rate of service delivery is above or equal to the rate of demand (consumers), (iv)–It produces byproducts which are manageable and do not threaten all above 3 (this is a direct measure of the environmental performance).

United Nations Sustainability Development Goals (UN SDG) framework is an umbrella framework for measuring SDG performance of a large enterprise such as a country. It defines 17 SDGs which are further divided into sub goals. The sub-goal description is a high-level achievement target or objective activities geared to achieve a specific SDG. Each sub-goal has indicators associated with it which are metrics that indicate some measure of achievement of the sub-goal. The SDGs are for humanity in general and addressed to governments or administrative units. How to achieve the goal or how to measure the parameters of the process for achieving the goal is not described in the UN SDG framework. At times—as expected—monitoring of indicator on continuous basis is the only way to measure the goal. In that sense the metrics are designed for conventional auditing outlook (wherein the output quantity is taken as an evidence of the correct process). For example, goal 1.5—build resilience for the poor has an indicator 1.5.2—direct loss attributed to disasters. That is the resilience is believed to be achieved if the economic loss is reduced over the years—this is too simplified indicator and may not be useful other than reporting. Similar examples exist, such as, goal 2.4—indicator 2.4.1; goal 9.1—indicator 9.1.1, 9.1.2. Furthermore, the ideal metric values or some sort of benchmarks that would have been helpful to assess the progress on each goal are not provided in the UN SDG framework.

Building resilient system is one of the important objectives for achieving the SDGs. However, resilience and vulnerability are not defined or measured directly. It is believed that reduced economic loss indicates that a resilient infrastructure is built, and vulnerability is identified. It is indirectly defined at 9.1.1, 1.2; 11.2.1. However, more comprehensive treatment is not reflected in the metrics for the resilience. The goals and the metrics are based on audit or reporting requirements. They do not give enough thought for measuring process parameters, especially for important parameter like resilience. Thus, at broader level there is a greater scope of designing metrics for the process of achieving goal, for example—resilience. The Global Reporting Initiative (GRI) guidelines enable sustainability reporting for an enterprise. While the enterprises across the globe are submitting GRI reports, it is still a challenging task. The goals are intertwined with each other, and these guidelines do not attempt to reduce the data complexity. Typical reports run in to hundreds of pages without providing meaningful insights. The SEE sense is lost in reporting numbers. Some of the attempts in literature do not provide holistic view and just map the SDGs to the identified pillars for sustainability. There are some past studies which mathematically formulate environmental burden or environmental performance of a company. Mathematical formulation is certainly helpful. However, it assumes that the data is available and collected by an enterprise on regular basis. Furthermore, it does not provide any guidelines on measurements. The index calculation assumes the point source data for most of the environmental factors. These isolated efforts need to be integrated for an enterprise, adapting ecoservices based approach for sustainability. There is a need to organize and interpret the SDGs for an enterprise for its sustainability and its contribution towards sustainable earth. Environmental performance of an enterprise is seen as one of the key differentiators for its socio-economic sustainability. An enterprise does not operate in isolation. It interacts with its social, economic, and ecological/environmental surroundings. The SDGs provide the broader framework for any entity of SEE change to remain relevant to the socio-ecology for longer time. One of the alternatives for the sustainability performance assessment of an enterprise is to design a single assessment module for each ecosystem (for example, air, water, and soil). This perspective would be helpful for goals directed for environmental impact. However, assessing contribution of a particular enterprise in polluting the ecosystem would be a difficult task.

SUMMARY

Embodiments of the present disclosure present technological improvements as solutions to one or more of the above-mentioned technical problems recognized by the inventors in conventional systems. For example, in one embodiment, a method for sustainable development goal (SDG) performance assessment of an enterprise is provided. The method includes receiving enterprise data collected using a plurality of sensors and mapping the enterprise data to a plurality of indicators of one or more Sustainable Development Goals (SDGs) using pre-defined configurations. Further, the method includes constructing a semantic network comprising a plurality of nodes corresponding to each of the plurality of indicators and a plurality of edges connecting one or more nodes among the plurality of nodes if the one or more nodes correspond to indicators of same SDG. The method further includes estimating degree of impact of each of the plurality of indicators in the semantic network on Social (S), Environmental (E) and Economic (E) values by calculating S, E, E scores using a neuro-fuzzy network. Furthermore, the method includes determining whether each of the plurality of indicators in the semantic network are one or more of Burden (B), Benefit (B) and Vulnerability (V) by computing B, B, V scores from the S, E, E scores using the neuro-fuzzy network and transforming the B, B, V scores to a color space to generate a color indicating SDG performance of the enterprise. The SDG performance represented in terms of the generated color is displayed on a LED panel.

In another aspect, a system for sustainable development goal (SDG) performance assessment of an enterprise is provided. The system includes: a memory storing instructions; one or more communication interfaces; a Light Emitting Diode (LED) panel connected to the one or more communication interfaces and one or more hardware processors coupled to the memory via the one or more communication interfaces, wherein the one or more hardware processors are configured by the instructions to: receive enterprise data collected using a plurality of sensors and mapping the enterprise data to a plurality of indicators of one or more Sustainable Development Goals (SDGs) using pre-defined configurations. Further, the one or more hardware processors are configured to construct a semantic network comprising a plurality of nodes corresponding to each of the plurality of indicators and a plurality of edges connecting one or more nodes among the plurality of nodes if the one or more nodes correspond to indicators of same SDG. The one or more hardware processors are further configured to estimate degree of impact of each of the plurality of indicators in the semantic network on Social (5), Environmental (E) and Economic (E) values by calculating 5, E, E scores using a neuro-fuzzy network. Furthermore, the one or more hardware processors are configured to determine whether each of the plurality of indicators in the semantic network are one or more of Burden (B), Benefit (B) and Vulnerability (V) by computing B, B, V scores from the S, E, E scores using the neuro-fuzzy network and transforming the B, B, V scores to a color space to generate a color indicating SDG performance of the enterprise. The SDG performance represented in terms of the generated color is displayed on the LED panel.

In yet another aspect, there are provided one or more non-transitory machine-readable information storage mediums comprising one or more instructions which when executed by one or more hardware processors cause a method for SDG performance assessment of an enterprise. The method includes receiving enterprise data collected using a plurality of sensors and mapping the enterprise data to a plurality of indicators of one or more Sustainable Development Goals (SDGs) using pre-defined configurations. Further, the method includes constructing a semantic network comprising a plurality of nodes corresponding to each of the plurality of indicators and a plurality of edges connecting one or more nodes among the plurality of nodes if the one or more nodes correspond to indicators of same SDG. The method further includes estimating degree of impact of each of the plurality of indicators in the semantic network on Social (S), Environmental (E) and Economic (E) values by calculating S, E, E scores using a neuro-fuzzy network. Furthermore, the method includes determining whether each of the plurality of indicators in the semantic network are one or more of Burden (B), Benefit (B) and Vulnerability (V) by computing B, B, V scores from the S, E, E scores using the neuro-fuzzy network and transforming the B, B, V scores to a color space to generate a color indicating SDG performance of the enterprise. The SDG performance represented in terms of the generated color is displayed on the LED panel.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Existing methods of assessing Sustainable Development Goal (SDG) of an enterprise have several drawbacks. Thus; embodiments of present disclosure provide a comprehensive framework for assessing sustainability performance of an enterprise. An enterprise is any entity of a group of people with some infrastructure/processes bringing social, economic, and environmental change. Hence, it could be as small as a retail shop, or it could be as large as an industrial setup like power plant, or even a metro city. A simplified data model is the backbone of the disclosed system that uses burden (B), benefits (B), and vulnerabilities (V) of the enterprise for organizing all the indicator data. Further to this, each indicator is mapped to SEE as well, based on their primary effect. The indicator values are used to create a semantic network. Based on the input values to this network and properties of the network it first determines their SEE contributions and then BBV. The BBV are further transformed to chromatic primaries of a colour space. Thus, the sustainability score is aggregated in the form of colour. For example, suppose burdens map to red primary, benefits map to green primary, and vulnerabilities to blue primary. Then, yellow colour indicates neutral performance as the enterprise is having equal benefits and burdens in SEE sense.

Referring now to the drawings, and more particularly to FIGS. 1 to 4B, where similar reference characters denote corresponding features consistently throughout the figures, there are shown preferred embodiments and these embodiments are described in the context of the following exemplary system and/or method.

Figure 1:
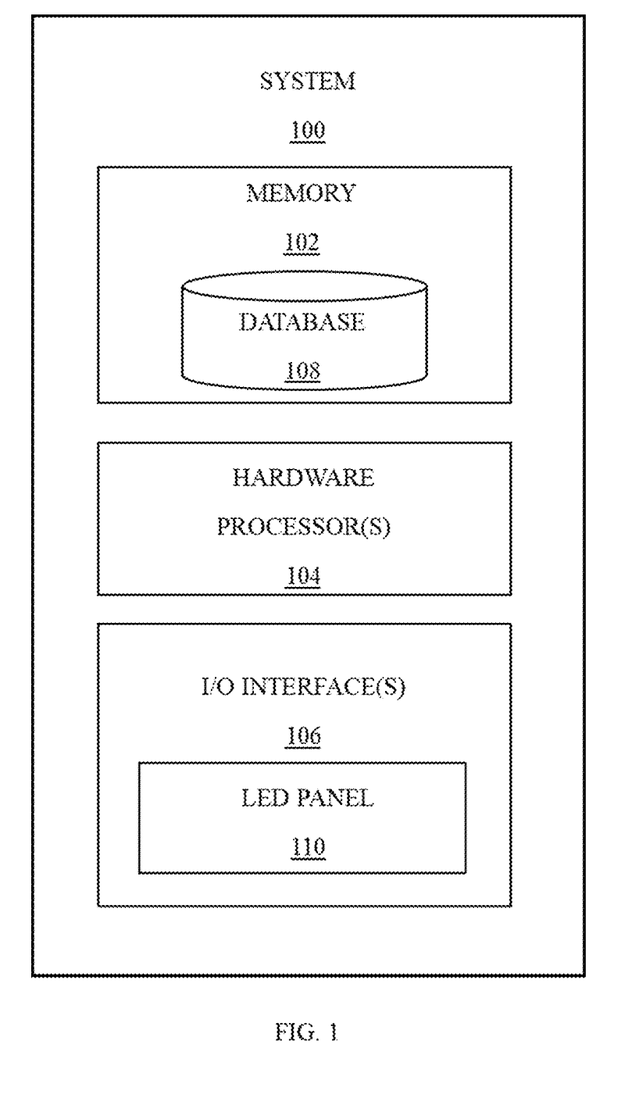
FIG. 1 illustrates an exemplary block diagram of a system for Sustainability Development Goal (SDG) performance assessment of an enterprise, according to some embodiments of the present disclosure.

FIG. 1 illustrates an exemplary block diagram of a system 100 for SDG performance assessment of an enterprise. In an embodiment, the system 100 includes one or more processors 104, communication interface device(s) 106 or Input/Output (I/O) interface(s) 106 or user interface 106, and one or more data storage devices or memory 102 operatively coupled to the one or more processors 104. The memory 102 comprises a database 108. The I/O interface 106 comprises a Light Emitting Diode (LED) panel 110 comprising one or more LEDs. In an embodiment, the LED panel comprises LEDs corresponding to each SDG and a LED representing overall SDG performance of the enterprise. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks NM and protocol types, including wired networks, for example, LAN, cable, etc., and wireless networks, such as WLAN, cellular, or satellite. In an embodiment, the I/O interface device(s) 106 receive configuration file as input from a user and display SDG performance score or a color indicating SDG performance score as an output to the user. In another embodiment, the I/O interface device(s) 106 displays a screen saver indicating SDG performance of an enterprise.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The database 108 may store information but not limited to information associated with at least one of: enterprise data, soft sensor(s), data from hard sensors, configuration file and so on. Further, the database 108 stores information pertaining to inputs fed to the system 100 and/or outputs generated by the system (e.g., at each stage), specific to the methodology described herein. Functions of the components of system 100 are explained in conjunction with flow diagram depicted in FIG. 2, systemic overview illustrated in FIG. 3 and examples illustrated in FIGS. 4A and 4B for SDG performance assessment of an enterprise.

Figure 2:
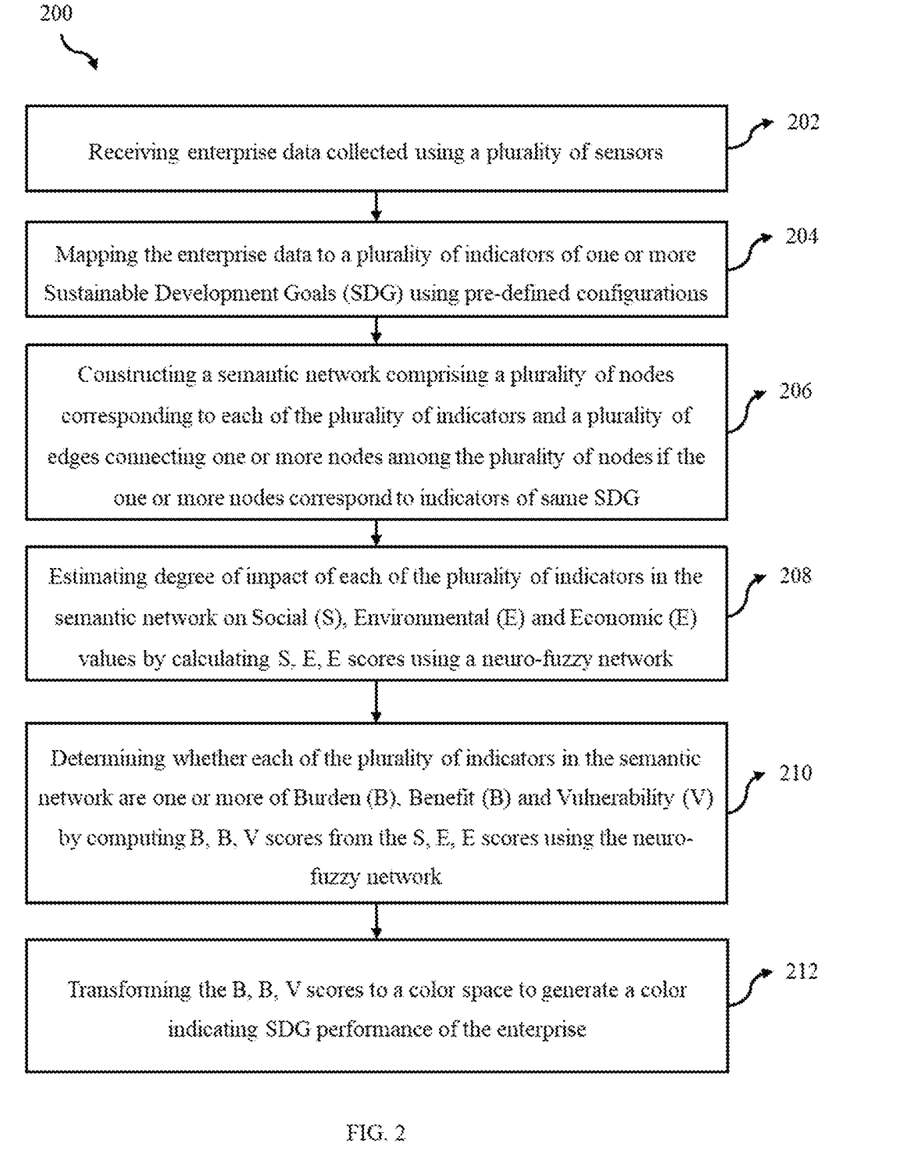
FIG. 2 is a flow diagram illustrating a method for Sustainability Development Goal (SDG) performance assessment of an enterprise, according to some embodiments of the present disclosure.

In an embodiment, the system 100 comprises one or more data storage devices or the memory 102 operatively coupled to the processor(s) 104 and is configured to store instructions for execution of steps of the method depicted in FIG. 2 by the processor(s) or one or more hardware processors 104. The steps of the method of the present disclosure will now be explained with reference to the components or blocks of the system 100 as depicted in FIG. 1, the steps of flow diagram as depicted in FIG. 2, the systemic overview depicted in FIG. 3 and examples illustrated in FIGS. 4A and 4B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3:
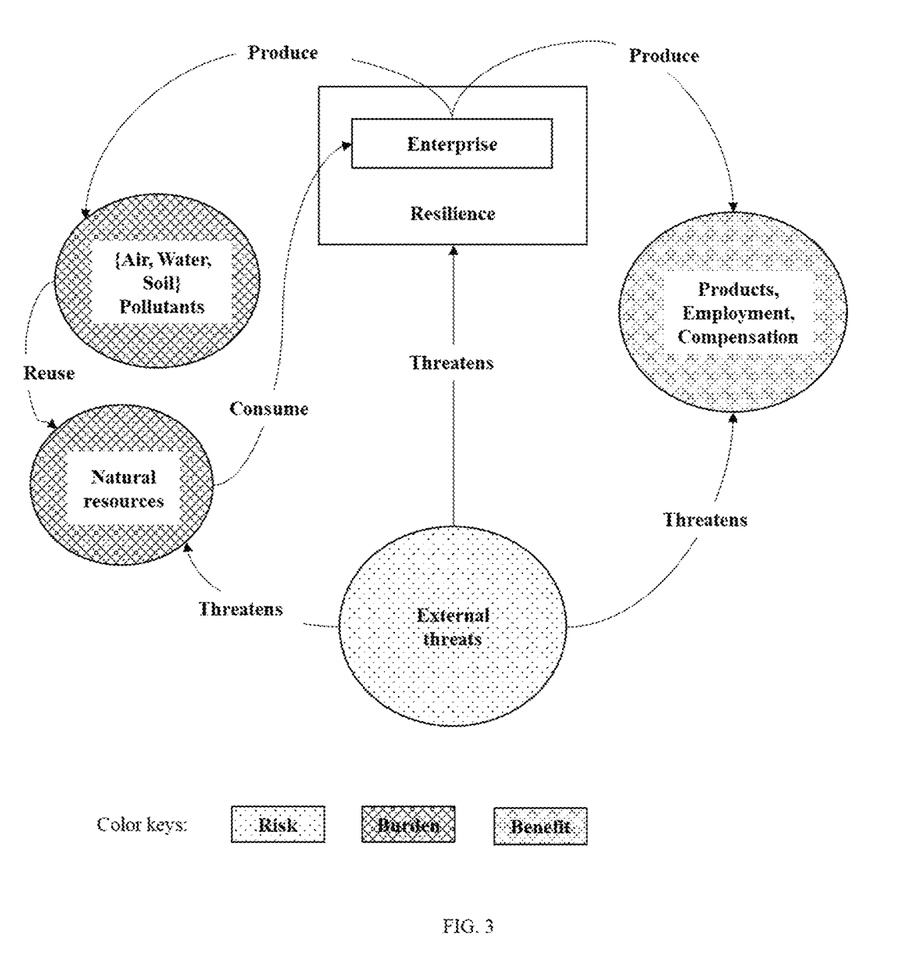
FIG. 3 illustrates systemic view of an enterprise activities, according to some embodiments of the present disclosure.

FIG. 3 illustrates systemic overview of an enterprise, according to some embodiments of the present disclosure. An enterprise is an entity of a group of people with some infrastructure or mechanism bringing social, economic, and environmental change. Hence it could be as small as a retail shop, or it could be as large as an industrial setup like power plant, or even a metro city. The activities of the enterprise, however small and big they are, impact its surroundings. The enterprise consumes society's resources and provide services to the individual member of the society. Each of these activities exhibit positive or negative effect on the SEE. The FIG. 3 illustrates the categories of each such activity at the broader level. The employment provided by the enterprise and services affect society positively. On the other hand, the waste produced by the enterprise pollutes the environment. Consumption of the resources, by and large, adds to the environmental burden. The enterprise and its activities are exposed to natural hazards as well. Natural hazards not only affect enterprise activities adversely but also natural resources and the society, in general. Resilience provides protective cover against natural hazards. Thus, any of the enterprise activities can be broadly categorized into benefit, burden, or vulnerability to the SEE easily. This can be summarized into approximate mathematical form by equations 1 to 4, wherein COM refers to SEE compensation, SB refers to SEE benefits, EB refers to SEE burden and V refers to Vulnerability.

$$\text{Sustainability} \cong COM + SB - EB - V \tag{1}$$

$$V \cong \text{Resilience} + \text{Exposure} \tag{2}$$

$$\text{Resilience} \cong \text{Sensitivity} + \text{Adaptability} + \text{Strength} \tag{3}$$

$$\text{Exposure} \cong \text{Likelihood} + \text{Potency} \tag{4}$$

FIG. 2 is a flow diagram illustrating a method 200 for SDG performance assessment of an enterprise, according to some embodiments of the present disclosure. At step 202 of the method 200, the one or more hardware processors 104 are configured to receive enterprise data collected using a plurality of sensors. The plurality of sensors includes hard sensors and soft sensors. The hard sensors are physical sensors such as in situ sensors and remote sensing satellite which along with Geographic Information System (GIS) provide hard sensing by collecting and record data from an environment. Table 1 provides an example mapping of GIS or remote sensors to indicators of SDGs. Soft sensors are models or methods that calculate the indicator values that can be used for further processing. The soft sensors include (but not limited to) machine learning (ML) models which take input data and predict target output for further processing. Unsupervised approaches or knowledge based approached can be used as well. Any suitable combination of supervised and unsupervised approaches is critical to provide the soft sensing capabilities. The soft sensors are stored in the database 108. Table 2 provides an example mapping of soft sensors to indicators of SDGs.

TABLE 1

Example mapping of spatially distributed hard sensors to indicators of SDGs
Hard sensor: Remote sensing Satellite

| SDG | Indicators |
|---|---|
| Goal 3: Good health and well being | Examining healthcare system via spatial analysis<br>Hospitals vicinity<br>Disease spread |
| Goal 6: Clean water and sanitation | Water distribution analysis<br>Water quality monitoring<br>Changes in water eco-system |
| Goal 11: Sustainable cities and communities | Satellite imagery to track the encroachment of lands<br>Real-time environment monitoring of air-quality, water quality monitoring |
| Goal 13: Climate action | Emission control system via satellite/GIS data<br>Natural Resources Management<br>Analysis of Hyper spectral and high-resolution satellite images and climate change modelling |
| Goal 15: Life on land | Soil quality monitoring<br>Forest cover monitoring<br>Effects of forest fires using satellite imagery<br>Green cover monitoring |
| Goal 14: Life below water | Plastic debris density analysis<br>Beach litter originating from national land-based sources |

TABLE 2

Example mapping of soft sensors to indicators of SDGs
Soft sensors

| SDG | Indicators |
|---|---|
| Goal 1: No poverty | Calculation of proportion of population below poverty line<br>Economic loss attributed to disasters |
| Goal 2: Zero hunger | Contributions to the agriculture sector<br>Detect anomalies in food pricing |
| Goal 4: Quality education | Record of proportion of individuals involved in upskilling in 12 months period<br>Measuring digital skill elevation among employees |

TABLE 2-continued

Example mapping of soft sensors to indicators of SDGs
Soft sensors

| SDG | Indicators |
|---|---|
| Goal 5: Gender equality | Compliance of legal frameworks put in place to avert gender-based discrimination<br>Increase in number of women at managerial positions |
| Goal 7: Affordable and clean energy | Proportion of renewable energy consumption<br>Amount of renewable energy generated on premise |
| Goal 8: Decent work and economic growth | Average hourly earnings of employees, by sex, age, occupation, and persons with disabilities<br>Material footprint |

Further, at step 204 of the method 200, the one or more hardware processors 104 are configured to map the enterprise data to a plurality of indicators of one or more Sustainable Development Goals (SDGs) using pre-defined configurations. The configurations maybe defined in a configuration file by an expert and stored in the database 108. The configuration file also contains details on metrics for evaluating each of the plurality of indicators. Thus, once the mapping is done, values of one or more metrics are calculated for evaluating each indicator among the plurality of indicators. Then, a normalized performance score is derived for each indicator based on the values of the one or more metrics. In an embodiment, the normalized performance score is a value in the range 0 to 1. Further, at step 206 of the method 200, the one or more hardware processors 104 are configured to construct a semantic network comprising a plurality of nodes corresponding to each of the plurality of indicators and a plurality of edges connecting one or more nodes among the plurality of nodes if the one or more nodes correspond to indicators of same SDG. Each node of the semantic network is linked to a first layer of a neuro fuzzy network using a plurality of membership functions. The neuro-fuzzy network is a neural network comprising the first layer and a second layer. The first layer includes: i) S node corresponding to Social value, ii) a first E node corresponding to Economic value, and iii) a second E node corresponding to Environmental value. The SEE layer is used to create fuzzy mapping of the impact of various indicator performances on society, economy, and the environment. The mapping is fuzzy because a particular indicator can have varying degrees of impact on each of the three components of the SEE layer. The second layer includes: i) a first B node corresponding to Burden, ii) a second B node corresponding to Benefit, and iii) V node corresponding to Vulnerability.

At step 208 of the method 200, the one or more hardware processors are configured to estimate degree of impact of each of the plurality of indicators in the semantic network on Social (S), Environmental (E) and Economic (E) values by calculating S, E, E scores using the neuro-fuzzy network. The plurality of membership functions are used to calculate the S, E, E scores from the normalized performance scores of the plurality of indicators. They are either pre-defined or are learnable from enterprise data. In an embodiment, the one or more membership functions are Gaussian functions which are bell shaped functions centered at −1, 0 and 1 corresponding to Social, Economy and Environment respectively. Further, at step 210 of the method 200, the one or more hardware processors 104 are configured to determine whether each of the plurality of indicators in the semantic network are one or more of Burden (B), Benefit (B) and Vulnerability (V) by computing B, B, V scores from the S, E, E scores using the neuro-fuzzy network. The S, E, E scores calculated in the previous step are given as output of the first layer of the neuro-fuzzy network which then activates the second layer of the neuro-fuzzy network. Strength of the activation is determined by activation functions which are used to calculate the B, B, V scores. In an embodiment, the one or more activation functions are nonlinear sigmoid functions. In another embodiment, activation functions are learned by providing example variable and value of output for a target indicator to a single attention layer. The attention layer learns the activation function as per the correct expected output. Thus, each indicator and thereby each SDG is evaluated at a plurality of dimensions comprising social value, environmental value, economic value, burden, benefit, and vulnerability. The calculations done by the neuro-fuzzy network can be summarized by equation 5, where O is output value of the neuro-fuzzy network, $N_i$ is $i^{th}$ input of the de-fuzzification layer; $n_{i0}, \ldots, n_{i6}$ are defuzzification coefficients. As shown in the equation 5, output is sum of product of inputs of the defuzzification layers and sum of the product of defuzzification coefficients with the input values, which helps to control and stabilize the output values. The value of the networks output O varies in [0,1] range.

$$O = \Sigma_{i=1}^{6} N_i (n_{i0} + n_{i1} \text{Vulnerability} + n_{i2} \text{Benefit} + n_{i3} \text{Burden} + n_{i4} \text{Social} + n_{i5} \text{Environmental} + n_{i6} \text{Economic}) \quad (5)$$

Further, at step 212 of the method 200, the one or more hardware processors are configured to transform the B, B, V scores to a color space to generate a color indicating SDG performance of the enterprise. The method 200 directly calculates trichromatic values in the color space by spread activation of the information as represented by data through the neuro fuzzy network and the semantic network. In an embodiment, Lab space model is considered as the color space. As understood by a person skilled in the art, Lab space model is a model for plotting absolute color coordinates and differences between colors wherein 'L' indicates lightness, 'a' indicates red/green value and 'b' indicates blue/yellow value. The burden value is considered as 'b' value in Lab space, benefit is considered to be 'a' value, vulnerability is considered to be "L" value. For example, indicators having high benefit and low burden transforms to colors like red/magenta. High burden less benefit transforms to colors like yellow. Alternately, if values of burden and benefit are in the ratio 1:4, then magenta color is displayed and if values of burden and benefit are in the ration 4:1, then yellow color is displayed. Since the value of vulnerability controls lightness, if it has a low value (close to 0) then dim or dull color is displayed and if it has a high value then bright color is displayed. In another embodiment, the BBV score is transformed to Red-Green-Blue (RGB) color space. Benefit is represented by green, burden by red, and vulnerability by blue. The BBV score with only benefit is displayed as green as others are zero, only burden would be seen as red. If enterprise has no vulnerabilities and it has some benefits and some burden—say equal—then a shade of brown is displayed—as red and green forms yellow-brown shades. Indicating the SDG performance of the enterprise by a color helps user to perceive it easily and in a better way than textual descriptions or recommendations.

Figure 4A:
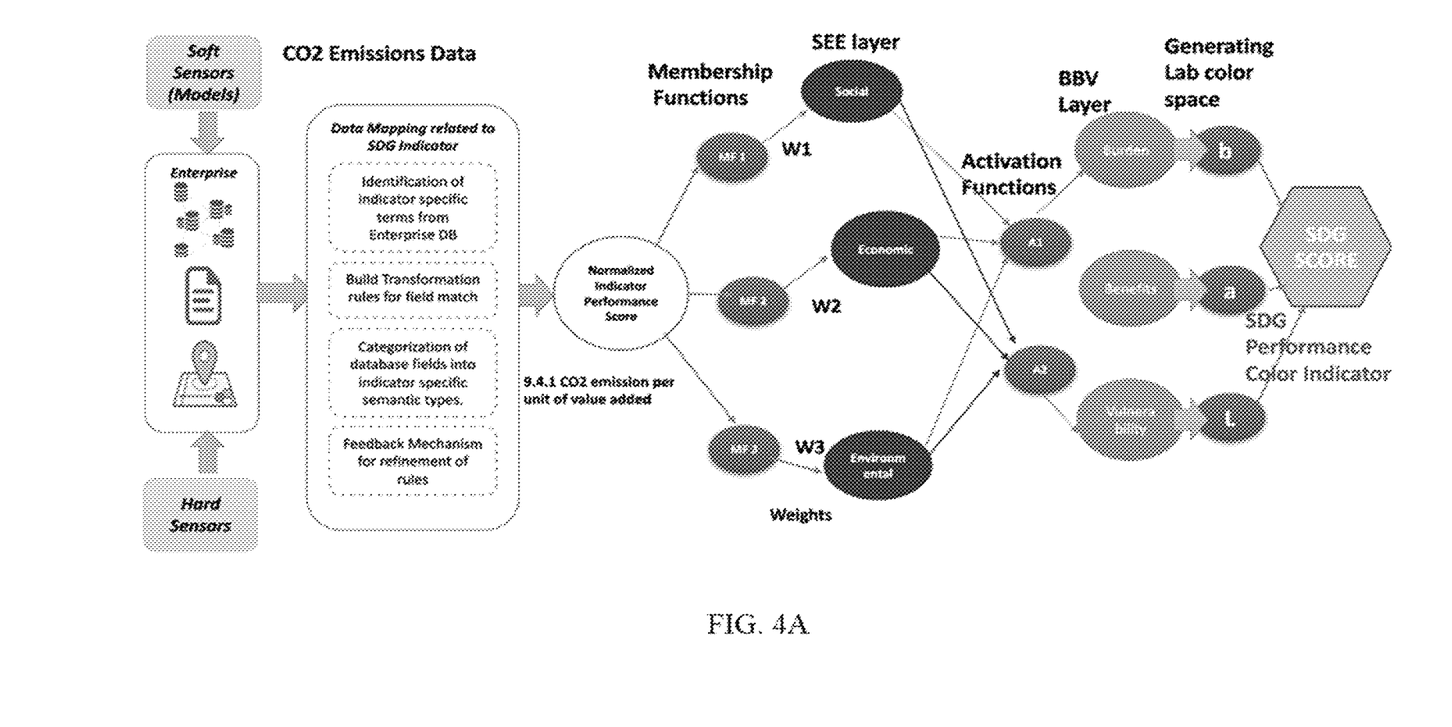
FIGS. 4A and 4B depict example implementation of method illustrated in FIG. 2, according to some embodiments of the present disclosure.
Figure 4B:
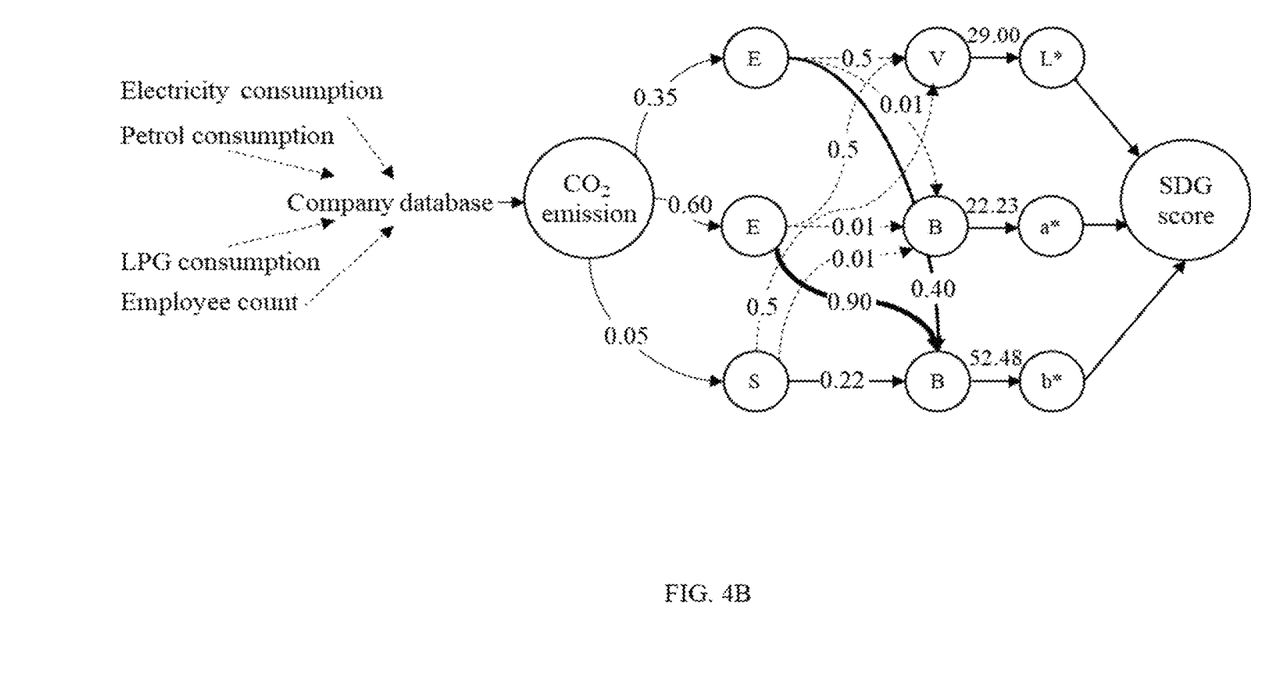

FIGS. 4A and 4B depict example implementation of method illustrated in FIG. 2, according to some embodiments of the present disclosure. They depict calculation of carbon footprint of an enterprise. Values are fed using hard and soft sensors. Hard sensors depict remote sensing data of SDG goal mapped to Goal 13 and Indicator 13.2.2 which helps in calculating the direct and indirect impact of an enterprise on carbon emission. The values are stored in the database 108 and soft sensors (AI models) are built on top for better estimation. SEE values are calculated which helps in identifying amount of impact on indicator(s) on each of Social, Environmental and Economic values. A fuzzy logic is used to know the degree of impact on SEE. Further, direct and indirect impact on BBV values is calculated. Each BBV value is linked to Lab colour space which further calculates RGB values for each SDG indicator indicating the final score. In this example, carbon emission of an enterprise was more dominant towards Burden and less on Benefit and Vulnerability. Burden values belongs to b in Lab colour space which implies the final value is more towards Blue/Yellow Value and less towards Red/Green Value. As indicated in FIG. 4B, the Lab values are (29.00, 22.23, 52.48) for the network which in-turn give RGB value as (111.38, 52.52, 0).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
   receiving, via one or more hardware processors, enterprise data collected using a plurality of sensors, wherein the plurality of sensors includes hard sensors and soft sensors, the hard sensors are physical sensors including in situ sensors and a remote sensing satellite which along with Geographic Information System (GIS) provide hard sensing by collecting data, record data from an environment, wherein the soft sensors includes machine learning (ML) models taking an input data and predict a target output, wherein the mapping of the soft sensors to indicators of SDGs, wherein when one of the SDG is clean energy and then the indicators mapped to the SDG is proportion of renewal energy consumption, amount of renewal energy generated on premise;
   mapping, via the one or more hardware processors, the enterprise data to a plurality of indicators of one or more Sustainable Development Goals (SDGs) using pre-defined configurations, wherein the pre-defined configurations are defined in a configuration file and contain details on metrics for evaluating each of the plurality of indicators, wherein the mapping of the enterprise data to indicators pertains to mapping of spatially distributed hard sensors to indicators of the SDGs, wherein the hard sensors depict remote sensing data of a SDG goal is a climate action and indicators are emission control system via satellite/GIS data, natural resources management, analysis of hyper spectral and high-resolution satellite images and climate change modelling that facilitates in calculating a direct and an indirect impact of an enterprise on carbon emission;
   constructing, via the one or more hardware processors, a semantic network comprising a plurality of nodes corresponding to each of the plurality of indicators and a plurality of edges connecting one or more nodes among the plurality of nodes if the one or more nodes correspond to indicators of same SDG, wherein each node of the semantic network is linked to a first layer of a neuro-fuzzy network using a plurality of membership functions, the neuro-fuzzy network is a neural network comprising a first layer and a second layer;
   estimating, via the one or more hardware processors, degree of impact of each of the plurality of indicators in the semantic network on Social(S), Environmental (E) and Economic (E) values by calculating S, E, E scores using a neuro-fuzzy network;
   determining, via the one or more hardware processors, whether each of the plurality of indicators in the semantic network are one or more of Burden (B), Benefit (B) and Vulnerability (V) by computing B, B, V scores from the S, E, E scores using the neuro-fuzzy network; and
   transforming, via the one or more hardware processors, the B, B, V scores to a Red-Green-Blue (RGB) color space to generate a color indicating SDG performance of the enterprise, wherein the SDG performance represented in terms of the generated color is displayed on a Light Emitting Diode 'LED' panel, wherein the LED panel comprises LEDs corresponding to each SDG and the LED represents overall SDG performance of the enterprise, wherein the carbon emission of the enterprise is dominant towards Burden (B) and less on Benefit (B) and Vulnerability (V), wherein the Burden (B) score belongs to 'b' in a lab colour space implying that a score is towards Blue/Yellow Value and less towards Red/Green Value, and the indicators with high benefit and low burden transforms to colors as red/magenta, and high burden and less benefit transforms color to yellow,
   wherein when the values of burden and benefit are in ratio of 1:4, then magenta color is displayed,
   and when the values of burden and benefit are in the ratio of 4:1, then yellow color is displayed,
   wherein the configuration file is received as an input through an input/output (I/O) interface device and the input/output (I/O) interface device displays the SDG performance or the color indicating the SDG performance as an output, wherein the input/output (I/O) interface device displays a screen saver indicating the SDG performance of the enterprise.

2. The method of claim 1, wherein the SDG performance of the enterprise is evaluated at a plurality of dimensions, wherein the plurality of dimensions comprises social value, environmental value, economic value, burden, benefit, and vulnerability.

3. The method of claim 1, wherein the first layer includes:
i) S node corresponding to Social value, ii) a first E node corresponding to Economic value, and iii) a second E node corresponding to Environmental value, and wherein the second layer includes:
   i) a first B node corresponding to Burden, ii) a second B node corresponding to Benefit, and
   iii) V node corresponding to Vulnerability.

4. The method of claim 1, wherein each of the plurality of indicators in the semantic network are linked to the first layer of the neuro-fuzzy network via a plurality of membership functions which are used to calculate the S, E, E scores.

5. The method of claim 3, wherein output of the first layer is used to activate the second layer of the neuro-fuzzy network, and wherein strength of the activation is determined by a plurality of activation functions which are used to calculate the B, B, V scores, wherein the plurality of activation functions are nonlinear sigmoid functions and an attention layer learns the activation functions by providing an example variable and a value of an output for a target indicator to a single attention layer.

6. The method of claim 1, wherein trichromatic values in the color space are directly calculated by spread activation of the information as represented by data through the neuro fuzzy network and the semantic network.

7. A system comprising:
a memory storing instructions;
one or more Input/Output (I/O) interface devices;
a Light Emitting Diode 'LED' panel connected to the one or more communication interfaces;
one or more hardware processors coupled to the memory via the one or more communication interfaces; wherein the one or more hardware processors are configured by the instructions to:
receive enterprise data collected using a plurality of sensors, wherein the plurality of sensors includes hard sensors and soft sensors, the hard sensors are physical sensors including in situ sensors and a remote sensing satellite which along with Geographic Information System (GIS) provide hard sensing by collecting data, record data from an environment, wherein the soft sensors includes machine learning (ML) models taking an input data and predict a target output, wherein the mapping of the soft sensors to indicators of SDGs, wherein when one of the SDG is clean energy and then the indicators mapped to the SDG is proportion of renewal energy consumption, amount of renewal energy generated on premise;
map the enterprise data to a plurality of indicators of one or more Sustainable Development Goals (SDGs) using pre-defined configurations, wherein the pre-defined configurations are defined in a configuration file and contain details on metrics for evaluating each of the plurality of indicators, wherein the mapping of the enterprise data to indicators pertains to mapping of spatially distributed hard sensors to indicators of the SDGs, wherein the hard sensors depict remote sensing data of a SDG goal is a climate action and indicators are emission control system via satellite/GIS data, natural resources management, analysis of hyper spectral and high-resolution satellite images and climate change modelling that facilitates in calculating a direct and an indirect impact of an enterprise on carbon emission;
construct a semantic network comprising a plurality of nodes corresponding to each of the plurality of indicators and a plurality of edges connecting one or more nodes among the plurality of nodes if the one or more nodes correspond to indicators of same SDG, wherein each node of the semantic network is linked to a first layer of a neuro-fuzzy network using a plurality of membership functions, the neuro-fuzzy network is a neural network comprising a first layer and a second layer;
estimate degree of impact of each of the plurality of indicators in the semantic network on Social(S), Environmental (E) and Economic (E) values by calculating S, E, E scores using a neuro-fuzzy network;
determine whether each of the plurality of indicators in the semantic network are one or more of Burden (B), Benefit (B) and Vulnerability (V) by computing B, B, V scores from the S, E, E scores using the neuro-fuzzy network; and
transform the B, B, V scores to a color space to generate a Red-Green-Blue (RGB) color indicating SDG performance of the enterprise, wherein the SDG performance represented in terms of the generated color is displayed on the Light Emitting Diode 'LED' panel, wherein the LED panel comprises LEDs corresponding to each SDG and the LED represents overall SDG performance of the enterprise, wherein the carbon emission of the enterprise is dominant towards Burden (B) and less on Benefit (B) and Vulnerability (V), wherein the Burden (B) score belongs to 'b' in a lab colour space implying that a score is towards Blue/Yellow Value and less towards Red/Green Value, and the indicators with high benefit and low burden transforms to colors as red/magenta, and high burden and less benefit transforms color to yellow,
wherein when the values of burden and benefit are in ratio of 1:4, then magenta color is displayed,
and when the values of burden and benefit are in the ratio of 4:1, then yellow color is displayed,
wherein the configuration file is received as an input through the I/O interface device and the input/output (I/O) interface device displays the SDG performance or the color indicating the SDG performance as an output, wherein the I/O interface device displays a screen saver indicating the SDG performance of the enterprise.

8. The system of claim 7, wherein the SDG performance of the enterprise is evaluated at a plurality of dimensions, wherein the plurality of dimensions comprise social value, environmental value, economic value, burden, benefit, and vulnerability.

9. The system of claim 7, wherein the first layer includes: i) S node corresponding to Social value, ii) a first E node corresponding to Economic value, and iii) a second E node corresponding to Environmental value, and wherein the second layer includes:
i) a first B node corresponding to Burden, ii) a second B node corresponding to Benefit, and
iii) V node corresponding to Vulnerability.

10. The system of claim 7, wherein each of the plurality of indicators in the semantic network are linked to the first layer of the neuro-fuzzy network via a plurality of membership functions which are used to calculate the S, E, E scores.

11. The system of claim 9, wherein output of the first layer is used to activate the second layer of the neuro-fuzzy network, and wherein strength of the activation is determined by a plurality of activation functions which are used to calculate the B, B, V scores, wherein the plurality of activation functions are nonlinear sigmoid functions and an attention layer learns the activation functions by providing an example variable and a value of an output for a target indicator to a single attention layer.

12. The system of claim 7, wherein trichromatic values in the color space are directly calculated by spread activation of the information as represented by data through neuro fuzzy semantic network.

13. One or more non-transitory machine-readable information storage mediums comprising one or more instructions which when executed by one or more hardware processors cause:

receiving enterprise data collected using a plurality of sensors, wherein the plurality of sensors includes hard sensors and soft sensors, the hard sensors are physical sensors including in situ sensors and a remote sensing satellite which along with Geographic Information System (GIS) provide hard sensing by collecting data, record data from an environment, wherein the soft sensors includes machine learning (ML) models taking an input data and predict a target output, wherein the mapping of the soft sensors to indicators of SDGs, wherein when one of the SDG is clean energy and then the indicators mapped to the SDG is proportion of renewal energy consumption, amount of renewal energy generated on premise;

mapping the enterprise data to a plurality of indicators of one or more Sustainable Development Goals (SDGs) using pre-defined configurations, wherein the pre-defined configurations are defined in a configuration file and contain details on metrics for evaluating each of the plurality of indicators, wherein the mapping of the enterprise data to indicators pertains to mapping of spatially distributed hard sensors to indicators of the SDGs, wherein the hard sensors depict remote sensing data of a SDG goal is a climate action and indicators are emission control system via satellite/GIS data, natural resources management, analysis of hyper spectral and high-resolution satellite images and climate change modelling that facilitates in calculating a direct and an indirect impact of an enterprise on carbon emission;

constructing a semantic network comprising a plurality of nodes corresponding to each of the plurality of indicators and a plurality of edges connecting one or more nodes among the plurality of nodes if the one or more nodes correspond to indicators of same SDG, wherein each node of the semantic network is linked to a first layer of a neuro-fuzzy network using a plurality of membership functions, the neuro-fuzzy network is a neural network comprising a first layer and a second layer;

estimating degree of impact of each of the plurality of indicators in the semantic network on Social(S), Environmental (E) and Economic (E) values by calculating S, E, E scores using a neuro-fuzzy network;

determining whether each of the plurality of indicators in the semantic network are one or more of Burden (B), Benefit (B) and Vulnerability (V) by computing B, B, V scores from the S, E, E scores using the neuro-fuzzy network; and transforming the B, B, V scores to a color space to generate a Red-Green-Blue (RGB) color indicating SDG performance of the enterprise, wherein the SDG performance represented in terms of the generated color is displayed on a Light Emitting Diode 'LED' panel, wherein the LED panel comprises LEDs corresponding to each SDG and the LED represents overall SDG performance of the enterprise, wherein the carbon emission of the enterprise is dominant towards Burden (B) and less on Benefit (B) and Vulnerability (V), wherein the Burden (B) score belongs to 'b' in a lab colour space implying that a score is towards Blue/Yellow Value and less towards Red/Green Value, and the indicators with high benefit and low burden transforms to colors as red/magenta, and high burden and less benefit transforms color to yellow, wherein when the values of burden and benefit are in ratio of 1:4, then magenta color is displayed, and when the values of burden and benefit are in the ratio of 4:1, then yellow color is displayed, wherein the configuration file is received as an input through an input/output (I/O) interface device and the input/output (I/O) interface device displays the SDG performance or the color indicating the SDG performance as an output, wherein the input/output (I/O) interface device displays a screen saver indicating the SDG performance of the enterprise.

14. The one or more non-transitory machine-readable information storage mediums of claim 13, wherein the SDG performance of the enterprise is evaluated at a plurality of dimensions, wherein the plurality of dimensions comprises social value, environmental value, economic value, burden, benefit, and vulnerability.

15. The one or more non-transitory machine-readable information storage mediums of claim 13, wherein the first layer includes: i) S node corresponding to Social value, ii) a first E node corresponding to Economic value, and iii) a second E node corresponding to Environmental value, and wherein the second layer includes: i) a first B node corresponding to Burden, ii) a second B node corresponding to Benefit, and iii) V node corresponding to Vulnerability.

16. The one or more non-transitory machine-readable information storage mediums of claim 13, wherein each of the plurality of indicators in the semantic network are linked to the first layer of the neuro-fuzzy network via a plurality of membership functions which are used to calculate the S, E, E scores.

17. The one or more non-transitory machine-readable information storage mediums of claim 15, wherein output of the first layer is used to activate the second layer of the neuro-fuzzy network, and wherein strength of the activation is determined by a plurality of activation functions which are used to calculate the B, B, V scores, wherein the plurality of activation functions are nonlinear sigmoid functions and an attention layer learns the activation functions by providing an example variable and a value of an output for a target indicator to a single attention layer.

18. The one or more non-transitory machine-readable information storage mediums of claim 13, wherein trichromatic values in the color space are directly calculated by spread activation of the information as represented by data through the neuro fuzzy network and the semantic network.

* * * * *